Patented Feb. 8, 1938

2,107,701

UNITED STATES PATENT OFFICE 2,107,701

METHOD OF MANUFACTURING GRANULATED POTASSIUM FERTILIZERS FROM POTASSIUM SULPHATE OR FROM SULPHATE OF POTASSIUM AND MAGNESIUM

Karl Haase and Helmut Werth, Bleicherode, Germany, assignors to the firm Preussische Bergwerks- und Hütten-Aktiengesellschaft, Berlin, Germany No Drawing. Application January 16, 1935, Serial No. 2,055. In Germany September 15, 1934

3 Claims. (Cl. 71—61)

In the potassium industry potassium sulphate, or sulphate of potassium-magnesia, are obtained by agitating solutions containing potassium sulphate-magnesium sulphate or magnesium sulphate with solid potassium chloride at a temperature of from 25 to 40° C. The technical potassium sulphate obtained in this way contains always a few percents of $MgSO_4$ as contamination. The products are floury, in consequence whereof they dust when being used as fertilizing agents after the drying, and besides, they are insufficiently strewable and likewise insufficiently handable.

Now, the above-mentioned fertilizing salts can, according to the present invention, be converted into more or less coarsely granulated, hard and well-shaped agglomerates by mixing the starting material with dry burnt lime, or calcium oxide respectively, and adding then water to this mixture; or by employing said lime or calcium oxide in the form of an aqueous suspension, the amount of the lime or oxide being in both cases small in proportion to the amount of the starting material, whereafter the moist-crumbly product obtained is transformed into granules which are dried until they have become hard. The drying and the hardening phase may be carried out in any of the known and heated drying drums used in the potassium industry.

By the interaction of the burnt or slaked lime (CaO) with equivalent parts of magnesium sulphate of the technical potassium sulphate, or of the potassium sulphate-magnesium sulphate respectively, and owing to the formation of calcium sulphate and magnesium-hydroxide by said interaction the individual salt particles are cemented together so as to constitute an agglomerate.

In order to obtain a sufficient granulation, preferably from 4 to 5% of the burnt lime (containing about 80% of CaO) relatively to the amount of salt to be formed are used, and so much water is added that the moist agglomerate contains about from 15 to 20% of $H_2O$.

It is known to produce the agglomeration of salts by mixing them with substances exerting a cementing action, or by adding substances forming a compound able to exert such an action by a chemical conversion with a portion of the starting material, but in all those processes other starting materials (mixed fertilizers, phosphorus fertilizer, potassium chloride fertilizer) or (and) other additional substances are used. It could not be foreseen that potassium sulphate and potassium sulphate-magnesium sulphate could be agglomerated with the low-priced and everywhere obtainable burnt lime in the above-described simple and economical manner.

Example 1

96 kg. of commercial potassium sulphate are intimately mixed with 4 kg. of finely ground burnt lime having a CaO-content of about 80%, whereafter the mixture is uniformly soaked with 18 liters of water. The thereby obtained moist-crumbly agglomerate is then shaped and dried to hardness in a heated rotary drum.

| Granulation shares | Screen analysis of the starting material | Screen analysis of the granulated product |
|---|---|---|
| Mm. diam. | Percent | Percent |
| Above 5 | 0,0 | 8,4 |
| Above 3–5 | 0,7 | 12,9 |
| Above 1–3 | 1,1 | 58,6 |
| Above 0,5–1 | 6,5 | 8,8 |
| Below 0,5 | 91,7 | 11,3 |

Example 2

96 kg. of commercial potassium sulphate-magnesium sulphate are uniformly mixed with a suspension of 4 kg. of burnt lime (having a content of CaO of about 80%) in 20 liters of water. The thereby obtained agglomerate is then shaped in a heated rotary drum and dried therein to hardness.

| Granulation shares | Screen analysis of the starting material | Screen analysis of the granulated product |
|---|---|---|
| Mm. diam. | Percent | Percent |
| Above 5 | 0,0 | 2,0 |
| Above 3–5 | 0,6 | 7,6 |
| Above 1–3 | 0,9 | 49,1 |
| Above 0,5–1 | 5,4 | 32,0 |
| Below 0,5 | 93,1 | 9,3 |

We claim:—
1. The method of manufacturing a granulated fertilizer from technical potassium sulphate containing magnesium salts selected from the group consisting of technical potassium sulphate-magnesium sulphate combinations, comprising adding thereto an amount small in proportion to the amount of the potassium salt, of quick lime (CaO) and intimately mixing the aforesaid materials in the presence of a quantity of water amounting to from 15% to 20% of the moist mixture, and agitating the moist crumbly product in a heated rotary drum, drying the mixture in a manner to granulate same into hard dry granules.

2. The method of manufacturing a granulated fertilizer from technical potassium sulphate containing magnesium salts selected from the group consisting of technical potassium sulphate-magnesium sulphate combinations, comprising adding thereto an amount small in proportion to the amount of the potassium salt, of dry pulverulent burnt lime (CaO) and intimately mixing the aforesaid materials, adding subsequently a sufficient quantity of water and likewise intimately mixing it with the aforesaid mixture, agitating the moist crumbly product containing from 15% to 20% of water, drying the mixture in a heated rotary drum in a manner to granulate same into hard dry granules.

3. The method of manufacturing a granulated fertilizer from technical potassium sulphate containing magnesium salts selected from the group consisting of technical potassium sulphate-magnesium sulphate combinations comprising adding thereto an amount small in proportion to the amount of the potassium salt, of an aqueous suspension of burnt lime (CaO) and intimately mixing the aforesaid materials in the presence of a quantity of water amounting to from 15% to 20% of the moist mixture, agitating the moist crumbly product containing from 15% to 20% of water, drying the mixture in a heated rotary drum, in a manner to granulate the product into hard dry granules.

KARL HAASE.
HELMUT WERTH.